US010803612B2

(12) United States Patent
Langeland

(10) Patent No.: US 10,803,612 B2
(45) Date of Patent: Oct. 13, 2020

(54) METHOD AND SYSTEM FOR STRUCTURE RECOGNITION IN THREE-DIMENSIONAL ULTRASOUND DATA BASED ON VOLUME RENDERINGS

(71) Applicant: General Electric Company, Schenectady, NY (US)

(72) Inventor: Stian Langeland, Vollen (NO)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 130 days.

(21) Appl. No.: 16/140,920

(22) Filed: Sep. 25, 2018

(65) Prior Publication Data
US 2020/0098125 A1   Mar. 26, 2020

(51) Int. Cl.
*G06K 9/00* (2006.01)
*G06T 7/70* (2017.01)
*G06T 15/08* (2011.01)

(52) U.S. Cl.
CPC ............... *G06T 7/70* (2017.01); *G06T 15/08* (2013.01); *G06T 2207/10028* (2013.01); *G06T 2207/10136* (2013.01); *G06T 2207/20081* (2013.01); *G06T 2207/30048* (2013.01)

(58) Field of Classification Search
None
See application file for complete search history.

(56) References Cited

PUBLICATIONS

Pourtaherian et al., "Robust and semantic needle detection in 3D ultrasound using orthogonal-plane convolutional neural networks", International Journal of Computer Assisted Radiology and Surgery, May 2018, 13:1321-1333 (Year: 2018).*
Looney et al., "Fully automated, real-time 3D ultrasound segmentation to estimate first trimester placental volume using deep learning", JCI Insight. 2018;3(10):e120178, May 17, 2018 (Year: 2018).*
Skehan, "Virtual Training System for Diagnostic Ultrasound ", Worcester Polytechnic Institute, Oct. 2011 (Year: 2011).*
Feng et al. "Automatic Fetal Face Detection From Ultrasound Volumes Via Learning 3D and 2D Information" 2009 IEEE Conference. (Year: 2009).*

* cited by examiner

*Primary Examiner* — Randolph I Chu
(74) *Attorney, Agent, or Firm* — McAndrews, Held & Malloy, Ltd.; Jacob Groethe; David Bates

(57) ABSTRACT

A system and method for recognizing structures in 3D ultrasound data based on volume renderings is provided. The method includes receiving 3D volume labels identifying a location of a structure in 3D training volumes. The method includes rendering each 3D training volume into multiple training volume renderings at multiple viewing angles. Each training volume rendering is associated with a volume rendering label corresponding with the 3D volume label. The method includes training a machine learning algorithm using the training volume renderings and associated volume rendering labels. The method includes acquiring and/or receiving a 3D volume and rendering it at a viewing angle. The method includes applying the machine learning algorithm to the volume rendering to detect and output the location of the structure. The method includes storing the location of the structure in the volume rendering in association with the 3D volume at a storage medium.

20 Claims, 5 Drawing Sheets

METHOD AND SYSTEM FOR STRUCTURE RECOGNITION IN THREE-DIMENSIONAL ULTRASOUND DATA BASED ON VOLUME RENDERINGS

FIELD

Certain embodiments relate to ultrasound imaging. More specifically, certain embodiments relate to a method and system for recognizing structures in three-dimensional (3D) ultrasound data based on volume renderings. The structure recognition may be performed automatically by image detection techniques such as machine learning algorithms (e.g., deep neural networks). The image detection techniques may be two-dimensional (2D) image detection techniques performed on the volume renderings.

BACKGROUND

Ultrasound imaging is a medical imaging technique for imaging organs and soft tissues in a human body. Ultrasound imaging uses real time, non-invasive high frequency sound waves to produce two-dimensional (2D), three-dimensional (3D), and/or four-dimensional (4D) (i.e., real-time/continuous 3D images) images.

Ultrasound imaging is a valuable, non-invasive tool for diagnosing various medical conditions. Acquired ultrasound data may be analyzed and/or processed to detect anatomical structures evaluated by a medical professional to perform the diagnosis. In cases where the ultrasound data is processed to detect the anatomical structures, one or more 2D ultrasound image slices may be selected from an acquired 3D volume and input into a processor executing a machine learning algorithm trained to identify specific structures in 2D images. The processor executing the machine learning algorithm may output an identification of the detected structures in the 2D image slices. Although the processed images may provide valuable information related to the detection of structures in the 2D image slices, the user does not receive any contextual information related to the structure with respect to the remainder of the acquired 3D volume. Machine learning algorithms exist for evaluating a 3D volume, however, these algorithms are not yet refined and are computationally expensive.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY

A system and/or method is provided for recognizing structures in three-dimensional (3D) ultrasound data based on volume renderings, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION

Figure 1:
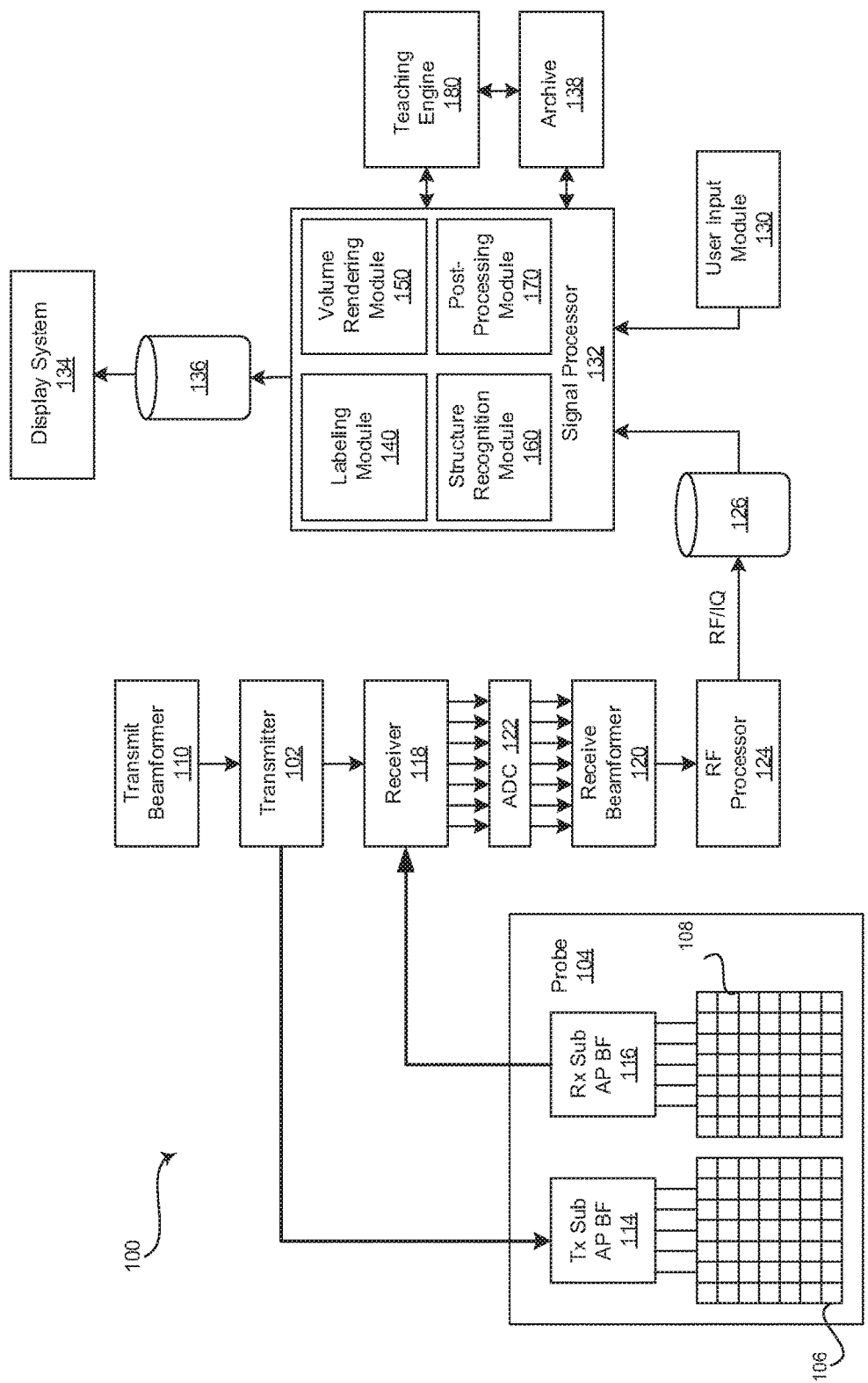
FIG. 1 is a block diagram of an exemplary ultrasound system that is operable to recognize structures in three-dimensional (3D) ultrasound data based on volume renderings, in accordance with various embodiments.

Certain embodiments may be found in a method and system for recognizing structures in three-dimensional (3D) ultrasound data based on volume renderings. Various embodiments have the technical effect of providing a trained machine learning algorithm developed for two-dimensional (2D) image analysis, the machine learning algorithm trained to detect structures in volume renderings (i.e., 2D representations of 3D data). Moreover, certain embodiments have the technical effect of automatically detecting structures in volume renderings by inputting the volume renderings into a machine learning algorithm developed for two-dimensional (2D) image analysis. Furthermore, various embodiments have the technical effect of providing automatic placement of markers on image data at positions corresponding with detected structure. Additionally, certain embodiments have the technical effect of enhancing visualization of detected structures in 3D image data by cropping and/or orienting the image volume in a pre-defined viewing angle in response a user selection or application of a setting to display a detected structure. Aspects of the present disclosure have the technical effect of providing an appropriate 2D plane re-sliced from a 3D volume in response to a selection for performing a particular anatomical measurement.

The foregoing summary, as well as the following detailed description of certain embodiments will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (e.g., processors or memories) may be implemented in a single piece of hardware (e.g., a general purpose signal processor or a block of random access memory, hard disk, or the like) or multiple pieces of hardware. Similarly, the programs may be stand alone programs, may be incorporated as subroutines in an operating system, may be functions in an installed software package, and the like. It should be understood that the various embodiments are not limited to the arrangements and instrumentality shown in the drawings. It should also be understood that the embodiments may be combined, or that other embodiments may be utilized and that structural, logical and electrical changes may be made without departing from the scope of the various embodiments. The following detailed description is, therefore, not to be taken in a limiting sense, and the scope of the present disclosure is defined by the appended claims and their equivalents.

As used herein, an element or step recited in the singular and proceeded with the word "a" or "an" should be understood as not excluding plural of said elements or steps, unless such exclusion is explicitly stated. Furthermore, references to "various embodiments," "exemplary embodiments," "certain embodiments," and the like are not intended to be interpreted as excluding the existence of additional embodiments that also incorporate the recited features. Moreover, unless explicitly stated to the contrary, embodiments "comprising," "including," or "having" an element or a plurality of elements having a particular property may include additional elements not having that property.

Also as used herein, the term "image" broadly refers to both viewable images and data representing a viewable image. However, many embodiments generate (or are configured to generate) at least one viewable image. In addition, as used herein, the phrase "image" is used to refer to an ultrasound mode such as B-mode (2D mode), M-mode, three-dimensional (3D) mode, four-dimensional (4D) mode, CF-mode, and/or sub-modes of B-mode and/or CF such as Shear Wave Elasticity Imaging (SWEI), TVI, Angio, B-flow, BMI, BMI_Angio, and in some cases also MM, CM, PW, TVD, CW where the "image" and/or "plane" includes a single beam or multiple beams.

Furthermore, the term processor or processing unit, as used herein, refers to any type of processing unit that can carry out the required calculations needed for the various embodiments, such as single or multi-core: CPU, Graphics Board, DSP, FPGA, ASIC or a combination thereof.

It should be noted that various embodiments described herein that generate or form images may include processing for forming images that in some embodiments includes beamforming and in other embodiments does not include beamforming. For example, an image can be formed without beamforming, such as by multiplying the matrix of demodulated data by a matrix of coefficients so that the product is the image, and wherein the process does not form any "beams". Also, forming of images may be performed using channel combinations that may originate from more than one transmit event (e.g., synthetic aperture techniques).

In various embodiments, ultrasound processing to form images is performed, for example, including ultrasound beamforming, such as receive beamforming, in software, firmware, hardware, or a combination thereof. One implementation of an ultrasound system having a software beamformer architecture formed in accordance with various embodiments is illustrated in FIG. 1.

FIG. 1 is a block diagram of an exemplary ultrasound system 100 that is operable to recognize structures in three-dimensional (3D) ultrasound data based on volume renderings, in accordance with various embodiments. Referring to FIG. 1, there is shown an ultrasound system 100. The ultrasound system 100 comprises a transmitter 102, an ultrasound probe 104, a transmit beamformer 110, a receiver 118, a receive beamformer 120, a RF processor 124, a RF/IQ buffer 126, a user input module 130, a signal processor 132, an image buffer 136, a display system 134, an archive 138, and a teaching engine 180.

The transmitter 102 may comprise suitable logic, circuitry, interfaces and/or code that may be operable to drive an ultrasound probe 104. The ultrasound probe 104 may comprise a two dimensional (2D) array of piezoelectric elements. The ultrasound probe 104 may comprise a group of transmit transducer elements 106 and a group of receive transducer elements 108, that normally constitute the same elements. In certain embodiment, the ultrasound probe 104 may be operable to acquire ultrasound image data covering at least a substantial portion of an organ, such as the heart or any suitable organ.

The transmit beamformer 110 may comprise suitable logic, circuitry, interfaces and/or code that may be operable to control the transmitter 102 which, through a transmit sub-aperture beamformer 114, drives the group of transmit transducer elements 106 to emit ultrasonic transmit signals into a region of interest (e.g., human, animal, underground cavity, physical structure and the like). The transmitted ultrasonic signals may be back-scattered from structures in the object of interest, like blood cells or tissue, to produce echoes. The echoes are received by the receive transducer elements 108.

The group of receive transducer elements 108 in the ultrasound probe 104 may be operable to convert the received echoes into analog signals, undergo sub-aperture beamforming by a receive sub-aperture beamformer 116 and are then communicated to a receiver 118. The receiver 118 may comprise suitable logic, circuitry, interfaces and/or code that may be operable to receive and demodulate the signals from the receive sub-aperture beamformer 116. The demodulated analog signals may be communicated to one or more of the plurality of A/D converters 122.

The plurality of A/D converters 122 may comprise suitable logic, circuitry, interfaces and/or code that may be operable to convert the demodulated analog signals from the receiver 118 to corresponding digital signals. The plurality of A/D converters 122 are disposed between the receiver 118 and the receive beamformer 120.

Notwithstanding, the disclosure is not limited in this regard. Accordingly, in some embodiments, the plurality of A/D converters 122 may be integrated within the receiver 118.

The receive beamformer 120 may comprise suitable logic, circuitry, interfaces and/or code that may be operable to perform digital beamforming processing to, for example, sum the delayed channel signals received from the plurality of A/D converters 122 and output a beam summed signal. The resulting processed information may be converted back to corresponding RF signals. The corresponding output RF signals that are output from the receive beamformer 120 may be communicated to the RF processor 124. In accordance with some embodiments, the receiver 118, the plurality of A/D converters 122, and the beamformer 120 may be integrated into a single beamformer, which may be digital.

The RF processor 124 may comprise suitable logic, circuitry, interfaces and/or code that may be operable to demodulate the RF signals. In accordance with an embodiment, the RF processor 124 may comprise a complex demodulator (not shown) that is operable to demodulate the RF signals to form I/Q data pairs that are representative of the corresponding echo signals. The RF or I/Q signal data may then be communicated to an RF/IQ buffer 126. The RF/IQ buffer 126 may comprise suitable logic, circuitry, interfaces and/or code that may be operable to provide temporary storage of the RF or I/Q signal data, which is generated by the RF processor 124.

The user input module 130 may be utilized to input labels of anatomical structures in image data, requests to display images illustrating a selected anatomical structure, instructions for marking and/or annotating detected anatomical structure in displayed image data, measurement selections, selections of protocols and/or templates, patient data, scan parameters, settings, and the like. In an exemplary embodiment, the user input module 130 may be operable to configure, manage and/or control operation of one or more components and/or modules in the ultrasound system 100. In this regard, the user input module 130 may be operable to configure, manage and/or control operation of the transmitter 102, the ultrasound probe 104, the transmit beamformer 110, the receiver 118, the receive beamformer 120, the RF processor 124, the RF/IQ buffer 126, the user input module 130, the signal processor 132, the image buffer 136, the display system 134, the archive 138, and/or the teaching engine 180. The user input module 130 may include button(s), rotary encoder(s), a touchscreen, motion tracking, voice recognition, a mousing device, keyboard, camera and/or any other device capable of receiving a user directive. In certain embodiments, one or more of the user input modules 130 may be integrated into other components, such as the display system 134, for example. As an example, user input module 130 may include a touchscreen display.

In various embodiments, anatomical structure depicted in image data may be labeled in response to a directive received via the user input module 130. In certain embodiments, a 3D volume may be post-processed to crop and/or orient the image volume in a pre-defined viewing angle in response to a directive to display a detected anatomical structure received via the user input module 130. In a representative embodiment, markers and/or annotations corresponding to detected anatomical structure may be overlaid on displayed image data in response to a directive received via the user input module 130. In an exemplary embodiment, a 3D volume may be re-sliced to display an appropriate 2D plane for performing a measurement in response to a directive selecting a measurement received via the user input module 130.

The signal processor 132 may comprise suitable logic, circuitry, interfaces and/or code that may be operable to process ultrasound scan data (i.e., RF signal data or IQ data pairs) for generating ultrasound images for presentation on a display system 134. The signal processor 132 is operable to perform one or more processing operations according to a plurality of selectable ultrasound modalities on the acquired ultrasound scan data. In an exemplary embodiment, the signal processor 132 may be operable to perform compounding, motion tracking, and/or speckle tracking. Acquired ultrasound scan data may be processed in real-time during a scanning session as the echo signals are received. Additionally or alternatively, the ultrasound scan data may be stored temporarily in the RF/IQ buffer 126 during a scanning session and processed in less than real-time in a live or off-line operation. In various embodiments, the processed image data can be presented at the display system 134 and/or may be stored at the archive 138. The archive 138 may be a local archive, a Picture Archiving and Communication System (PACS), or any suitable device for storing images and related information. In the exemplary embodiment, the signal processor 132 may comprise a labeling module 140, a volume rendering module 150, a structure recognition module 160, and a post-processing module 170.

The ultrasound system 100 may be operable to continuously acquire ultrasound scan data at a frame rate that is suitable for the imaging situation in question. Typical frame rates range from 20-70 but may be lower or higher. The acquired ultrasound scan data may be displayed on the display system 134 at a display-rate that can be the same as the frame rate, or slower or faster. An image buffer 136 is included for storing processed frames of acquired ultrasound scan data that are not scheduled to be displayed immediately. Preferably, the image buffer 136 is of sufficient capacity to store at least several minutes' worth of frames of ultrasound scan data. The frames of ultrasound scan data are stored in a manner to facilitate retrieval thereof according to its order or time of acquisition. The image buffer 136 may be embodied as any known data storage medium.

The signal processor 132 may include a labeling module 140 that comprises suitable logic, circuitry, interfaces and/or code that may be operable to associate labels with anatomical structures in 3D image volumes. Each of the labels may be metadata associated with a corresponding 3D volume. The labels may each include a set of 3D coordinates corresponding with the location of the identified anatomical structure in the 3D volume. For example, an ultrasound operator may use the labeling module 140 to navigate the presentation of 2D slices of a 3D volume at the display system 134. In various embodiments, the 2D slices may be presented in sets of intersecting planes, such as a set of perpendicular 2D slices. The ultrasound operator may operate the user input module 130 to select locations in the intersecting 2D slices that correspond with a particular anatomical structure. The selected locations in the intersecting 2D slices correspond with a set of 3D coordinates of the 3D volume. As another example, an ultrasound operator may use the labeling module 140 to navigate volume renderings of a 3D volume. The ultrasound operator may operate the user input module 130 to select locations of anatomical structure in the volume renderings that correspond with a set of 3D coordinates of the 3D volume. The labels associated with the anatomical structures in the 3D image volumes may be stored with or in relation to the associated 3D image volume as metadata. For example, the labels having the 3D coordinates may be stored at archive 138 and/or at any suitable storage medium.

The labeling module 140 may be used to label hundreds of 3D image volumes having a particular anatomical structure. The labeled 3D image volumes may be used to train the structure recognition module 160 to identify the particular anatomical structure as described in more detail below. The anatomical structures may include structures of the heart, lungs, fetus, or any suitable internal body structures. For example, with reference to a heart, the anatomical structures labeled via the labeling module 140 may include a mitral valve, aortic valve, ventricle chambers, atria chambers, septum, papillary muscle, inferior wall, and/or any suitable heart structure.

The signal processor 132 may include a volume rendering module 150 that comprises suitable logic, circuitry, interfaces and/or code that may be operable to perform volume rendering on 3D volumes. The volume rendering module 150 may be used to generate and present projections (e.g., 2D projections) of the volumetric (e.g., 3D) datasets. In this regard, rendering a 2D projection of a 3D dataset may comprise setting or defining a perception angle in space relative to the object being displayed, and then defining or computing necessary information (e.g., opacity and color) for every voxel in the dataset. This may be done, for example, using suitable transfer functions for defining RGBA (red, green, blue, and alpha) value for every voxel. The resulting volume rendering may include a depth map correlating a depth value to each pixel in the 2D projection.

In various embodiments, the volume rendering module 150 may be configured to render 3D volumes that were previously labeled by the labeling module 140 into multiple viewing angles. For example, the volume rendering module 150 may generate eight (8) volume renderings at eight (8) different viewing angles. Although eight (8) viewing angles are specified, any number of viewing angles may be used. In certain embodiments, the number and/or orientations of the viewing angles may be pre-defined. In an exemplary embodiment, the volume rendering module 150 may render multiple (e.g., hundreds) 3D volumes of a particular labeled structure at a same set of viewing angles. Additionally and/or alternatively, the number and/or orientations of the viewing angles may be random. The resulting set of volume renderings at different viewing angles, each having associated 2D coordinates corresponding with the labeled structure may be provided to the teaching engine 180 for use in training the structure recognition module 160 as described below. Additionally and/or alternatively, the set of volume renderings at different viewing angles with associated 2D coordinates may be stored at archive 138 and/or at any suitable storage medium.

In a representative embodiment, the volume rendering module 150 may be configured to generate one or more volume renderings of a 3D volume that has not been labeled. The one or more volume renderings may be generated in response to a user directive provided by the user input module 130. For example, the user directive may correspond with an instruction to acquire or retrieve a 3D volume, a selection of a portion of a 3D volume for viewing, or any suitable user directive. Additionally and/or alternatively, the one or more volume rendering may be generated automatically. For example, the volume rendering module 150 may be configured to automatically generate volume renderings of acquired and/or stored 3D volumes. In an exemplary embodiment, the generated volume renderings may be input into the structure recognition module 160 of the signal processor 132 to obtain information regarding anatomical structures present in the volume rendering to provide enhanced visualization and navigation of acquired and/or retrieved 3D volumes.

The signal processor 132 may include a structure recognition module 160 that comprises suitable logic, circuitry, interfaces and/or code that may be operable to apply image detection techniques to process volume renderings to identify anatomical structure in the volume renderings. The image detection techniques of the structure recognition module 160 may include image detection algorithms, one or more deep neural networks and/or any suitable form of image detection techniques or machine learning processing functionality configured to automatically identify anatomical structure in the volume renderings. For example, the structure recognition module 160 may be made up of an input layer, an output layer, and one or more hidden layers in between the input and output layers. Each of the layers may be made up of a plurality of processing nodes that may be referred to as neurons. For example, the input layer may have a neuron for each pixel or a group of pixels from the volume rendering of the organ. The output layer may have a neuron corresponding to each structure of the organ being imaged and may provide the 2D coordinates of any identified structured recognized in the volume rendering. As an example, if imaging a heart, the output layer may include neurons for a mitral valve, the aortic valve, the tricuspid valve, the pulmonary valve, the left atrium, the right atrium, the left ventricle, the right ventricle, the septum, the papillary muscle, the inferior wall, unknown, and/or other. Each neuron of each layer may perform a processing function and pass the processed ultrasound image information to one of a plurality of neurons of a downstream layer for further processing. As an example, neurons of a first layer may learn to recognize edges of structure in the ultrasound image data. The neurons of a second layer may learn to recognize shapes based on the detected edges from the first layer. The neurons of a third layer may learn positions of the recognized shapes relative to landmarks in the volume renderings. The processing performed by the structure recognition module 160 deep neural network may identify anatomical structure and the location of the structure in the volume renderings with a high degree of probability.

In various embodiments, the 2D coordinates of any identified structure in the volume rendering may be stored in association with the volume rendering at archive 138 and/or at any suitable storage medium. The signal processor 132 may determine the Z coordinate corresponding with each set of 2D coordinates based on the depth map associated with the volume rendering. The 2D coordinates and the Z coordinate may form a set of 3D coordinates of the anatomical structure detected by the structure recognition module 160 in the volume rendering. In certain embodiments, the set of 3D coordinates of the location of recognized structure in the volume rendering may be transformed to a corresponding set of 3D coordinates of the same location in the 3D volume. For example, the transformation of 3D coordinates may be based on the difference in the reference coordinate systems of the volume rendering and the 3D volume. The set(s) of 3D coordinates may be stored in association with the volume rendering and/or the 3D volume at archive 138 and/or at any suitable storage medium.

The signal processor 132 may include a post-processing module 170 that comprises suitable logic, circuitry, interfaces and/or code that may be operable to process the 3D volume based on the associated 3D coordinates and in response to stored settings and/or a directive received from the user input module 130. For example, the post-processing module 170 may access a stored setting or receive a user selection to present an image of a particular detected structure, such as the aorta of the heart or any suitable anatomical structure of any suitable internal body structure. The post-processing module 170 may access the 3D volume and associated 3D coordinates in response to the setting or received selection and process the 3D volume to present an optimal view of the detected structure. The optimal view may be defined by stored settings providing the parameters for execution by the post-processing module 170. The post-processing parameters may include cropping instructions, a viewing angle, and/or any suitable post-processing parameter. The post-processing module 170 may execute the post-processing parameters to manipulate the 3D volume to create the post-processed image for presentation at the display system 134. For example, the post-processing module 170 may manipulate the 3D volume to the appropriate viewing angle based on the settings and the 3D coordinates of the selected structure. As another example, the post-processing module 170 may crop the 3D volume to, for example, remove image data in front of the selected anatomical structure as defined by the 3D coordinates. The post-processed image may be presented at the display system 134 and/or stored at archive 138 and/or at any suitable storage medium.

As another example, the post-processing module 170 may access a stored setting or receive a user selection to present an image or series of images of a particular detected structure having markings and/or annotations identifying the detected structure. The post-processing module 170 may receive one or more rendered views of one or more 3D volumes and may process the volume renderings to overlay marker(s) and/or annotations on the volume renderings based on the stored 2D or 3D coordinates. For example, the post-processing module 170 may automatically superimpose a marker on a mitral valve of the heart detected in 4D volume renderings presented at the display system 134 based on the coordinates identifying the mitral valve associated with the volume renderings by the structure recognition module 160.

In certain embodiments, the post-processing module 170 may be utilized to perform measurements of detected anatomical structures. For example, an ultrasound operator may desire to perform a heart measurement, such as a left ventricle internal diameter at end systole (LVIDs) measurement, an interventricular septum at end systole (IVSs) measurement, a left ventricle posterior wall at end systole (LVPWs) measurement, or an aortic valve diameter (AV Diam) measurement. The post-processing module 170 may re-slice the 3D volume based on the 3D coordinates of the detected structure (e.g., left ventricle, septum, posterior wall, aortic valve) to extract the appropriate 2D plane for performing the selected measurement. The post-processing module 170 may present the appropriate 2D plane at the display system 134 and may calculate and present the values of the measurements in response to a user placement of the selected measurement (e.g., user placement of start and end points of a caliper measurement on the 2D plane).

Still referring to FIG. 1, the teaching engine 180 may comprise suitable logic, circuitry, interfaces and/or code that may be operable to train the neurons of the deep neural network(s) of the structure recognition module 160. For example, the teaching engine 180 may train the deep neural networks of the structure recognition module 160 using databases(s) of volume renderings labeled by the labeling module 140. In various embodiments, each of the labeled volume renderings may be associated with one of a plurality of viewing angles. As an example, a structure recognition module 160 deep neural network may be trained by the teaching engine 180 with multiple different viewing angles of volume renderings having associated anatomical structure 2D coordinates to train the structure recognition module 160 with respect to the characteristics of the particular anatomical structure, such as the appearance of structure edges, the appearance of structure shapes based on the edges, the positions of the shapes in the ultrasound image data, and the like. In certain embodiments, the organ may be a heart and the structural information may include information regarding the edges, shapes, positions, and timing information (e.g., end diastole, end systole, etc.) of a mitral valve, aortic valve, pericardium, posterior wall, septal wall, interventricular septum, right ventricle, left ventricle, right atrium, left atrium, and/or the like. In various embodiments, the databases of training volume renderings may be generated by labeling 3D volumes by labeling module 140, rendering the labeled 3D volumes into a plurality of viewing angles by volume rendering module 150, and storing the volume renderings provided at defined viewing angles and with 2D coordinate labels identifying the anatomical structure in the archive 138 or any suitable data storage medium. In certain embodiments, the teaching engine 180 and/or training image databases may be external system(s) communicatively coupled via a wired or wireless connection to the ultrasound system 100.

Figure 2:
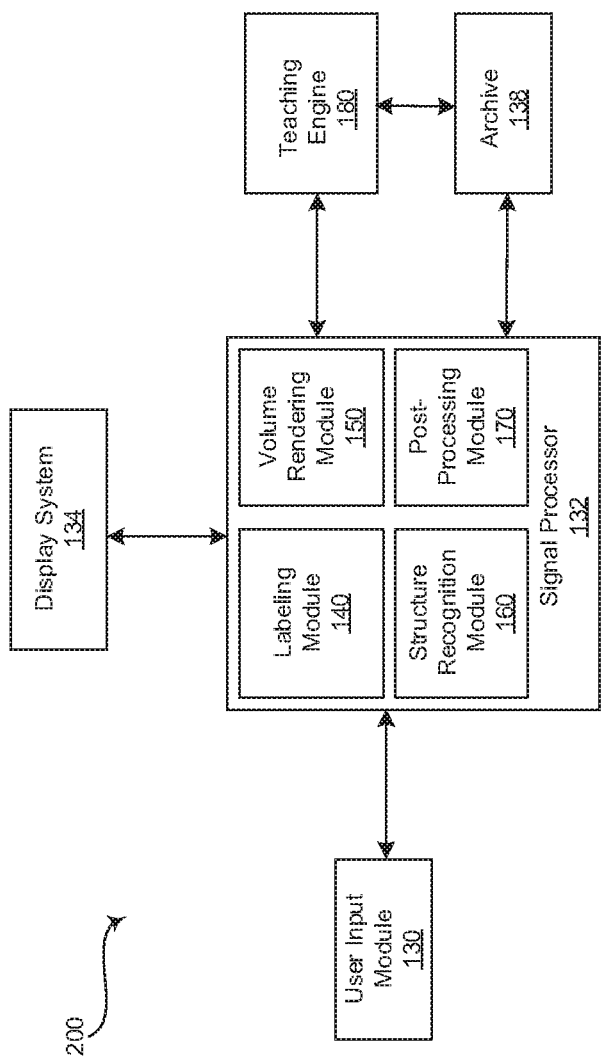
FIG. 2 is a block diagram of an exemplary medical workstation that is operable to recognize structures in three-dimensional (3D) ultrasound data based on volume renderings, in accordance with various embodiments.

FIG. 2 is a block diagram of an exemplary medical workstation 200 that is operable to recognize structures in three-dimensional (3D) ultrasound data based on volume renderings, in accordance with various embodiments. In various embodiments, components of the medical workstation 200 may share various characteristics with components of the ultrasound system 100, as illustrated in FIG. 1 and described above. Referring to FIG. 2, the medical workstation 200 comprises a display system 134, a signal processor 132, an archive 138, and a user input module 130, among other things. Components of the medical workstation 200 may be implemented in software, hardware, firmware, and/or the like. The various components of the medical workstation 200 may be communicatively linked. Components of the medical workstation 200 may be implemented separately and/or integrated in various forms. For example, the display system 134 and the user input module 130 may be integrated as a touchscreen display.

The display system 134 may be any device capable of communicating visual information to a user. For example, a display system 134 may include a liquid crystal display, a light emitting diode display, and/or any suitable display or displays. The display system 134 can be operable to display information from the signal processor 132 and/or archive 138, such as medical images or any suitable information.

The signal processor 132 may be one or more central processing units, microprocessors, microcontrollers, and/or the like. The signal processor 132 may be an integrated component, or may be distributed across various locations, for example. The signal processor 132 comprises a labeling module 140, a volume rendering module 150, a structure recognition module 160, and a post-processing module 170, as described above with reference to FIG. 1, and may be capable of receiving input information from a user input module 130 and/or archive 138, generating an output displayable by a display system 134, and manipulating the output in response to input information from a user input module 130, among other things. The signal processor 132, labeling module 140, volume rendering module 150, structure recognition module 160, and/or post-processing module 170 may be capable of executing any of the method(s) and/or set(s) of instructions discussed herein in accordance with the various embodiments, for example.

The archive 138 may be one or more computer-readable memories integrated with the medical workstation 200 and/or communicatively coupled (e.g., over a network) to the medical workstation 200, such as a Picture Archiving and Communication System (PACS), a server, a hard disk, floppy disk, CD, CD-ROM, DVD, compact storage, flash memory, random access memory, read-only memory, electrically erasable and programmable read-only memory and/or any suitable memory. The archive 138 may include databases, libraries, sets of information, or other storage accessed by and/or incorporated with the signal processor 132, for example. The archive 138 may be able to store data temporarily or permanently, for example. The archive 138 may be capable of storing medical image data, data generated by the signal processor 132, and/or instructions readable by the signal processor 132, among other things. In various embodiments, the archive 138 stores 3D volumes, labeled 3D volumes, labeled volume renderings, volume renderings processed by the structure recognition module 160, 3D volumes with associated 3D coordinates corresponding to detected structures, post-processed volume renderings, post-processing parameters and settings, and/or instructions for performing volume rendering, training machine learning algorithms, processing volume renderings using the trained machine learning algorithms, assigning a depth coordinate to a set of 2D coordinates identifying a structure location in a volume rendering, cropping and/or orienting a 3D volume, superimposing markers and/or annotations corresponding to detected structure on displayed image data, and/or performing measurements, among other things.

The user input module 130 may include any device(s) capable of communicating information from a user and/or at the direction of the user to the signal processor 132 of the medical workstation 200, for example. As discussed above with respect to FIG. 1, the user input module 130 may include a touch panel, button(s), a mousing device, keyboard, rotary encoder, trackball, camera, voice recognition, and/or any other device capable of receiving a user directive.

Figure 3:
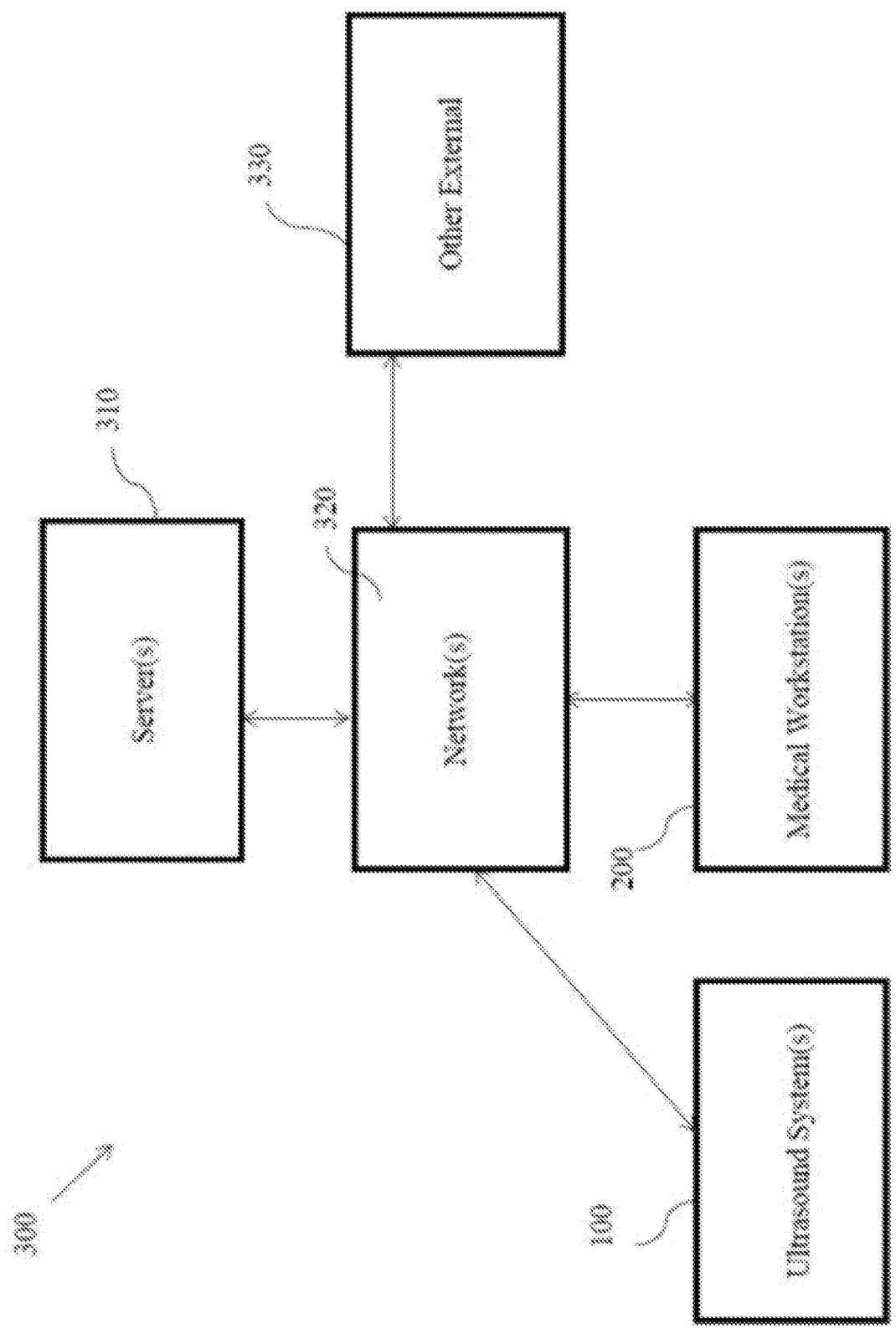
FIG. 3 is a block diagram of an exemplary system in which a representative embodiment may be practiced.

FIG. 3 is a block diagram of an exemplary system 300 in which a representative embodiment may be practiced. As illustrated in FIG. 3, the system 300 includes one or more servers 310. The server(s) 310 may include, for example, web server(s), database server(s), application server(s), and the like. The server(s) 310 may be interconnected, and may singly or as a group be connected to a network 320, such as the Internet, for example, via any suitable combination of wired or wireless data communication links. FIG. 3 also includes external systems 330. The external systems 330 may be interconnected, and may singly or as a group be connected to a network 320, such as the Internet, for example, via any suitable combination of wired or wireless data communication links. The server(s) 310 and/or the external systems 330 may include a signal processor 132 and/or an archive 138 as described above. FIG. 3 includes one or more ultrasound systems 100 and/or medical workstations 200 as described above with reference to FIGS. 1 and 2. The ultrasound systems 100 and/or medical workstations 200 may be connected to the network 320 by any suitable combination of wired or wireless data communication links. In various embodiments, the server(s) 310 and/or the external systems 330 may be operable to process volume renderings based on 3D ultrasound data to recognize structures in the volume renderings for association to the 3D ultrasound data. For example, the functionality of one or more of the volume rendering module 150, structure recognition module 160, and/or post-processing module 170 may be performed by the server(s) 310 and/or the external systems 330 in the background or at the direction of a user via one or both of the ultrasound systems 100 and/or the medical workstations 200. The ultrasound image data processed and stored by the server(s) 310 and/or the external systems 330 may be accessed by the ultrasound systems 100 and/or the medical workstations 200 via network(s) 320.

Figure 4:
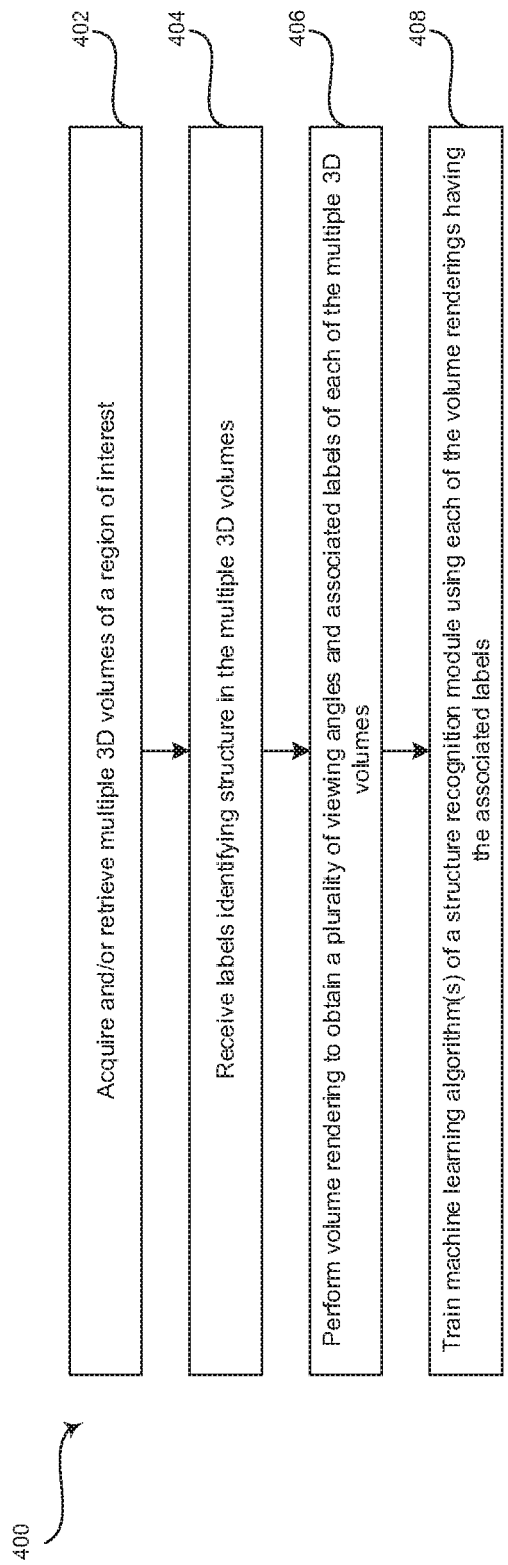
FIG. 4 is a flow chart illustrating exemplary steps that may be utilized for training machine learning algorithm(s) of a structure recognition module to recognize structures in volume rendering views, in accordance with exemplary embodiments.

FIG. 4 is a flow chart 400 illustrating exemplary steps 402-408 that may be utilized for training machine learning algorithm(s) of a structure recognition module 160 to recognize structures in volume rendering views, in accordance with exemplary embodiments. Referring to FIG. 4, there is shown a flow chart 400 comprising exemplary steps 402 through 408. Certain embodiments may omit one or more of the steps, and/or perform the steps in a different order than the order listed, and/or combine certain of the steps discussed below. For example, some steps may not be performed in certain embodiments. As a further example, certain steps may be performed in a different temporal order, including simultaneously, than listed below.

At step 402, an ultrasound system 100 may acquire and/or a signal processor 132 may retrieve multiple 3D volumes of a region of interest. For example, the ultrasound system 100 may acquire 3D volumes with an ultrasound probe 104. The ultrasound probe 104 may provide the acquired 3D volumes to the signal processor 132. As another example, a signal processor 132 of a workstation 200 or ultrasound system 100 may retrieve 3D volumes from an archive 138 or any suitable data storage medium. The 3D volumes may be acquired or retrieved, for example, one at a time as needed by subsequent step 404, as a group of 3D volumes, or as multiple groups over time.

At step 404, the signal processor 132 of the ultrasound system 100 or workstation 200 may receive labels identifying structure in the 3D volumes. For example, a user executing a labeling module 140 of the signal processor 132 may view image data corresponding with each of the 3D volumes acquired and/or retrieved at step 402 and may provide labels (where applicable) corresponding to structure depicted in the 3D volumes. The labels may include 3D coordinates identifying the location of the structure depicted in the 3D volumes. The labeling module 140 may present 2D intersecting slices from the 3D volume or a rendering of the 3D volume for receiving the labels by a user via a user input module 130. The labels may be stored in association with the 3D volume at archive 138 and/or any suitable storage medium.

At step 406, the signal processor 132 of the ultrasound system 100, workstation 200, server(s) 310, or external system 330 may render each of the 3D volumes to generate volume renderings at a plurality of viewing angles and having labels identifying the structure in each of the volume renderings. For example, a volume rendering module 150 of the signal processor 132 may be configured to generate renderings of each 3D volume at multiple different viewing angles. The number and viewing angles of the volume renderings of each 3D volume may be consistent or random. For example, each 3D volume may be rendered into twelve (12) volume renderings having the same or random twelve (12) different viewing angles. Although twelve (12) viewing angles are specified, any number of viewing angles may be used. The 3D coordinates of the labels associated with each of the 3D volumes may be transformed into 2D coordinates corresponding with each of the generated volume renderings, which are 2D representations of the 3D volumes. The volume renderings and associated labels may be stored at archive 138 and/or any suitable storage medium.

At step 408, machine learning algorithm(s) of a structure recognition module 160 of the signal processor 132 may be trained using each of the volume renderings having the associated labels. For example, the signal processor 132 may include or be in communication with a teaching engine 180. The teaching engine may be operable to retrieve the volume renderings with associated labels from storage and input them into the structure recognition module 160 to train the machine learning algorithms (e.g., deep neural networks) of the structure recognition module 160. The teaching engine 180 may retrieve the volume renderings labeled by the labeling module 140 at step 404 and rendered at step 406 from archive 138 and/or any suitable storage medium. The structure recognition module 160 machine learning algorithms may be trained by the teaching engine 180 with the multiple different viewing angles of volume renderings having associated anatomical structure 2D coordinates to train the structure recognition module 160 with respect to the characteristics of the particular anatomical structure, such as the appearance of structure edges, the appearance of structure shapes based on the edges, the positions of the shapes in the ultrasound image data, and the like. The training process fine tunes the machine learning algorithms to consistently and reliably recognize the labeled structures in volume renderings provided to the structure recognition module 160 of the signal processor 132 without labels.

Figure 5:
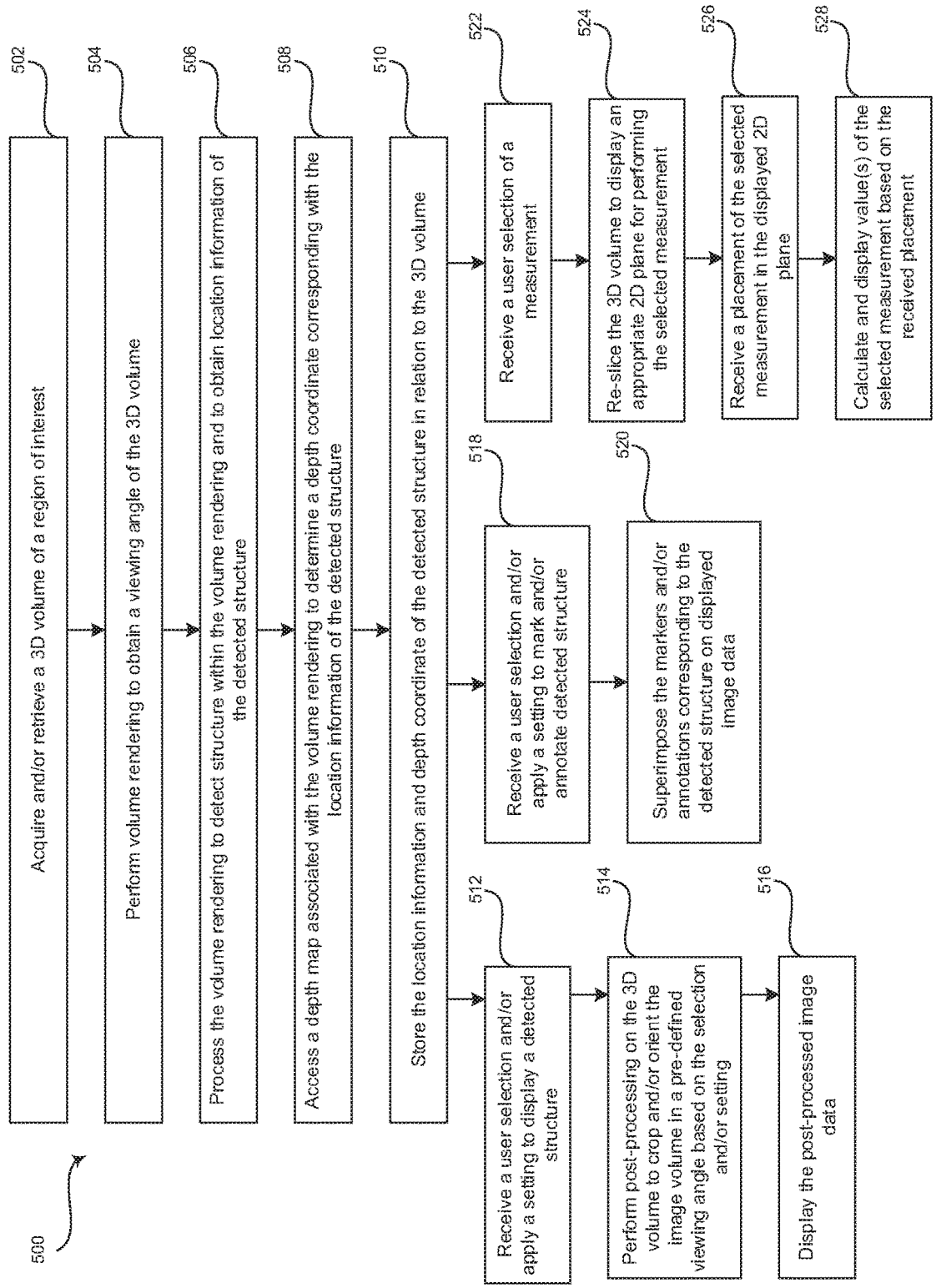
FIG. 5 is a flow chart illustrating exemplary steps that may be utilized for recognizing structures in three-dimensional (3D) ultrasound data based on volume renderings, in accordance with exemplary embodiments.

FIG. 5 is a flow chart 500 illustrating exemplary steps 502-528 that may be utilized for recognizing structures in three-dimensional (3D) ultrasound data based on volume renderings, in accordance with exemplary embodiments. Referring to FIG. 5, there is shown a flow chart 500 comprising exemplary steps 502 through 528. Certain embodiments may omit one or more of the steps, and/or perform the steps in a different order than the order listed, and/or combine certain of the steps discussed below. For example, some steps may not be performed in certain embodiments. As a further example, certain steps may be performed in a different temporal order, including simultaneously, than listed below.

At step 502, an ultrasound system 100 may acquire and/or a signal processor 132 may retrieve a 3D volume of a region of interest. For example, the ultrasound system 100 may acquire a 3D volume image (or a series of 3D volumes forming a 4D image) with an ultrasound probe 104. As another example, a signal processor 132 of a workstation 200, server 310, external system 330, or ultrasound system 100 may retrieve the 3D volume(s) from an archive 138 or any suitable data storage medium.

At step 504, the signal processor 132 of the ultrasound system 100, workstation 200, server(s) 310, or external system 330 may render the 3D volume acquired and/or retrieved at step 502. For example, a volume rendering module 150 of the signal processor 132 may be configured to generate a volume rendering of the 3D volume at a viewing angle. The volume rendering generated by the volume rendering module 150 is a 2D representation of the 3D volume. In certain embodiments, the volume rendering module 150 may create a depth map associated with the generated volume rendering. The depth map may identify a Z value for each set of 2D coordinates (e.g., each pixel) in the volume rendering. The volume rendering module 150 may store the volume rendering and corresponding depth map at archive 138 and/or any suitable storage medium.

At step 506, the signal processor 132 may process the volume rendering to automatically detect structure within the volume rendering and to obtain location information of the detected structure. For example, a structure recognition module 160 of the signal processor 132 of the ultrasound system 100, workstation 200, server 310, and/or external system 330 may process the volume rendering to detect structure and output the location information associated with the detected structure. The location information may include 2D coordinates of the structure detected in the volume rendering. The structure may correspond with anatomical structure of an internal body structure, such as the heart, lungs, or any suitable internal body structure. As an example, the detected structure in a volume rendering of the heart may include, among other things, a mitral valve, aortic valve, ventricle chambers, atria chambers, septum, papillary muscle, inferior wall, and/or any suitable heart structure. The structure recognition module 160 may execute image detection techniques to process the volume rendering. The image detection techniques may include machine learning algorithms, such as deep neural networks, trained to detect specific anatomical structure. In an exemplary embodiment, the structure recognition module 160 may be operable to process volume renderings, which are 2D representations of 3D image data, and to output the 2D coordinates of detected structure. The location information of the detected structure may be stored with the volume rendering as metadata, for example, at archive 138 and/or any suitable storage medium.

At step 508, the signal processor 132 may access a depth map associated with the volume rendering to determine a depth (Z) coordinate corresponding with the location information of the detected structure. For example, the location information of the detected structure may include 2D coordinates of the structure in the volume rendering. The signal processor 132 may look up the depth (Z) value associated with the particular 2D coordinates from the depth map. The 2D coordinates and depth (Z) coordinate form a set of 3D coordinates associated with the location of the detected structure.

At step 510, the signal processor 132 may store the location information and depth coordinate of the detected structure in relation to the 3D volume. For example, the 2D coordinates and depth (Z) coordinate form a set of 3D coordinates associated with the location of the detected structure. The signal processor 132 may transform the set of 3D coordinates of the location of recognized structure in the volume rendering to a corresponding set of 3D coordinates of the same location in the 3D volume based on the difference in the reference coordinate systems of the volume rendering and the 3D volume. The set of 3D coordinates may be stored as metadata in association with the 3D volume at archive 138 and/or at any suitable storage medium.

Steps 512-516 set forth a first exemplary post-processing function that utilizes the 3D volume and its associated location information and depth coordinate of detected structure to enhance visualization of the views of the 3D volume to a user. At step 512, the signal processor 132 may receive a user selection and/or apply a setting to display a detected structure. For example, a post-processing module 170 may receive a user selection via a user input module to navigate the 3D volume to an image of a mitral valve of the heart, or any suitable anatomical structure of any suitable internal body structure. The user selection may be provided by, for example, selecting a button, drop down menu item, entering a selection in a text box, or providing any suitable selectable identifier presented at a display system 134. As another example, the post-processing module 170 may execute a stored setting to automatically navigate to the defined view of the detected anatomical structure.

At step 514, the signal processor 132 may perform post-processing on the 3D volume to crop and/or orient the image volume in a pre-defined viewing angle based on the selection and/or setting. For example, the available user selections and/or settings of step 512 may each be associated with instructions for executing the post-processing. The instructions may include post-processing parameters executable to manipulate the 3D volume to generate the post-processed image for presentation at the display system 134. The post-processing parameters may include cropping instructions, a view angle, and/or any suitable post-processing parameter. In certain embodiments, the post-processing module 170 may manipulate the 3D volume to the appropriate viewing angle based on the settings and the 3D coordinates of the selected structure. In an exemplary embodiment, the post-processing module 170 may crop the 3D volume to remove image data in the foreground of the selected anatomical structure as defined by the 3D coordinates.

At step 516, the signal processor 132 may display the post-processed image data. For example, the post-processed image may be presented at the display system 134 and/or stored at archive 138 and/or at any suitable storage medium.

Steps 518-520 set forth a second exemplary post-processing function that utilizes the 3D volume and its associated location information and depth coordinate of detected structure to enhance visualization of the views of the 3D volume (or series of 3D volumes forming a 4D image) to a user. At step 518, the signal processor 132 may receive a user selection and/or apply a setting to mark and/or annotate detected structure. For example, a post-processing module 170 may receive a user selection via a user input module to mark a mitral valve of the heart, or any suitable anatomical structure of any suitable internal body structure, in images presented at a display system 134. The user selection may be provided by selecting a button, drop down menu item, and/or any suitable selection mechanism. As another example, the post-processing module 170 may execute a stored setting to automatically mark and/or annotate detected structure in displayed images.

At step 520, the signal processor 132 may superimpose the markers and/or annotations corresponding to the detected structure on displayed image data. For purposes of this disclosure, a marker may be a visual object of any size, shape, color, and the like that may be overlaid on an image to bring attention to a particular feature depicted in the image. An annotation may be textual information or a link to textual information overlaid on an image. In various embodiments, the post-processing module 170 may receive one or more rendered views of one or more 3D volumes and may process the volume renderings to overlay marker(s) and/or annotations on the volume renderings based on the stored 2D or 3D coordinates. For example, the post-processing module 170 may automatically superimpose a marker on a mitral valve of the heart detected in 4D volume renderings presented at the display system 134 based on the coordinates identifying the mitral valve associated with the volume renderings by the structure recognition module 160.

Steps 524-528 set forth a third exemplary post-processing function that utilizes the 3D volume and its associated location information and depth coordinate of detected structure to enhance the ability of a user to execute measurements related to the detected structure. At step 522, the signal processor 132 may receive a user selection of a measurement to perform related to detected structure in a 3D volume. For example, a post-processing module 170 of the signal processor 132 may receive a user selection via a user input module to select a particular measurement. The user selection may be provided by selecting a button, drop down menu item, entering a selection in a text box, or providing any suitable measurement selection. Examples of measurement that may be performed on a heart include, among other things, a left ventricle internal diameter at end systole (LVIDs) measurement, an interventricular septum at end systole (IVSs) measurement, a left ventricle posterior wall at end systole (LVPWs) measurement, or an aortic valve diameter (AV Diam) measurement.

At step 524, the signal processor 132 may re-slice the 3D volume to display an appropriate 2D plane for performing the selected measurement. For example, the post-processing module 170 of the signal processor 132 may re-slice the 3D volume based on the 3D coordinates of the detected structure (e.g., left ventricle, septum, posterior wall, aortic valve) to extract the appropriate 2D plane for performing the selected measurement. The post-processing module 170 may present the appropriate 2D plane at the display system 134.

At step 526, the signal processor 132 may receive a placement of the selected measurement in the displayed 2D plane. For example, the post-processing module 170 may receive the placement of calipers in the 2D plane identifying start and end points of the measurement as defined by a user via a user input module 130. As another example, the post-processing module 170 may receive the placement of a perimeter in the 2D plane identifying the boundaries of an area measurement.

At step 528, the signal processor 132 may calculate and display value(s) of the selected measurement based on the received placement. For example, the post-processing module 170 may calculate a distance between caliper start and end points, an area within a defined perimeter, or any suitable measurement calculation. The result of the calculation may be presented at the display system 134 and/or stored at archive 138 and/or any suitable storage medium.

Aspects of the present disclosure provide a method 400, 500 and system 100, 200, 300 for recognizing structures in three-dimensional (3D) ultrasound data based on volume renderings. In accordance with various embodiments, the method 400, 500 may comprise receiving 404, by the at least one processor 132, 140, a 3D volume label for each of a plurality of 3D ultrasound training volumes identifying a location of a structure. The method 400, 500 may comprise rendering 406, by the at least one processor 132, 150, each of the plurality of 3D ultrasound training volumes into a plurality of training volume renderings at a plurality of viewing angles. Each of the plurality of training volume renderings may be associated with a volume rendering label corresponding with the 3D volume label identifying the location of the structure. The method 400, 500 may comprise training 408 a machine learning algorithm using each of the plurality of training volume renderings and the respective associated volume rendering label. The method 400, 500 may comprise one or both of acquiring or receiving 502 a 3D ultrasound volume. The method 400, 500 may comprise rendering 504, by the at least one processor 132, 150, the 3D ultrasound volume into a volume rendering at a viewing angle. The method 400, 500 may comprise applying 506, by the at least one processor 132, 160, the machine learning algorithm to the volume rendering to detect the location of the structure. The machine learning algorithm may output the location of the structure in the volume rendering. The method 400, 500 may comprise storing 510, by the at least one processor 132, 160, the location of the structure in the volume rendering in association with the 3D ultrasound volume at a storage medium 138.

In a representative embodiment, the rendering 506 the 3D ultrasound volume into the volume rendering comprises generating a depth map corresponding with the volume rendering. The depth map may associate each set of two-dimensional (2D) coordinates of the volume rendering with a depth coordinate. In an exemplary embodiment, the location of the structure in the volume rendering output by the machine learning algorithm is a set of 2D coordinates. In certain embodiments, the storing 510 the location of the structure in the volume rendering in association with the 3D ultrasound volume at a storage medium 138 comprises at least four steps. The first step may include accessing 508 the depth map corresponding with the volume rendering and retrieving the depth value associated with the set of 2D coordinates identifying the location of the structure in the volume rendering. The second step may include forming a set of 3D volume rendering coordinates based on the set of 2D coordinates identifying the location of the structure in the volume rendering and the depth value associated with the set of 2D coordinates. The third step may include transforming the set of 3D volume rendering coordinates to a set of 3D ultrasound volume coordinates based on a difference between a reference coordinate system of the volume rendering and a reference coordinate system of the 3D ultrasound volume. The fourth step may include storing 510 the 3D ultrasound volume coordinates in association with the 3D ultrasound volume at the storage medium 138.

In various embodiments, the method 400, 500 may comprise one or both of receiving a user selection or applying a setting 512 to display the structure located in the 3D ultrasound volume. The method 400, 500 may comprise performing 514, by the at least one processor 132, 170, post-processing on the 3D ultrasound volume to generate a post-processed image. The post-processing may be based on the location of the structure and in response to one or both of the user selection or the setting to one or both of manipulate the 3D ultrasound volume into a pre-defined viewing angle and crop the 3D ultrasound volume. The method 400, 500 may comprise presenting 516, at a display system 134, the post-processed image.

In certain embodiments, the method 400, 500 may comprise one or both of receiving a user selection or applying a setting 518 to superimpose one or both of a marker or an annotation on the volume rendering in relation to the structure in the volume rendering. The method 400, 500 may comprise superimposing 520, by the at least one processor 132, 170, the one or both of the marker or the annotation on the volume rendering in relation to the structure in the volume rendering in response to the one or both of the user selection or the setting. The method 400, 500 may comprise presenting 520 the volume rendering with the one or both of the marker or the annotation at a display system 134.

In an exemplary embodiment, the method 400, 500 may comprise receiving 522 a user selection of a measurement. The method 400, 500 may comprise re-slicing 524, by the at least one processor 132, 170, the 3D ultrasound volume based on the stored location of the structure to display a 2D plane for performing the measurement. The method 400, 500 may comprise receiving 526 a placement of the measurement in the 2D plane. The method 400, 500 may comprise calculating by the at least one processor 132, 170 and displaying 528 at a display system 134 a value of the measurement based on the placement.

In a representative embodiment, the 3D volume label comprises a set of 3D coordinates identifying the location of the structure in one of the plurality of 3D ultrasound training volumes. The volume rendering label may comprise a set of 2D coordinates identifying the location of the structure in one of the plurality of training volume renderings.

Various embodiments provide a system 100, 200, 300 for recognizing structures in three-dimensional (3D) ultrasound data based on volume renderings. The system 100, 200, 300 may comprise at least one processor 132, 140, 150, 160, 170 and a storage medium 138. The at least one processor 132, 140 may be configured to receive a 3D volume label for each of a plurality of 3D ultrasound training volumes identifying a location of a structure. The at least one processor 132, 150 may be configured to render each of the plurality of 3D ultrasound training volumes into a plurality of training volume renderings at a plurality of viewing angles. Each of the plurality of training volume renderings may be associated with a volume rendering label corresponding with the 3D volume label identifying the location of the structure. The at least one processor 132, 180 may be configured to train a machine learning algorithm 160 using each of the plurality of training volume renderings and the respective associated volume rendering label. The at least one processor 132 may be configured to receive a 3D ultrasound volume. The at least one processor 132, 150 may be configured to render the 3D ultrasound volume into a volume rendering at a viewing angle. The at least one processor 132, 160 may be configured to apply the machine learning algorithm to the volume rendering to detect the location of the structure. The machine learning algorithm may output the location of the structure in the volume rendering. The storage medium 138 may be configured to store the location of the structure in the volume rendering in association with the 3D ultrasound volume.

In certain embodiments, the at least one processor 132, 150 is configured to generate a depth map corresponding with the volume rendering. The depth map associates each set of 2D coordinates of the volume rendering with a depth coordinate. In an exemplary embodiment, the location of the structure in the volume rendering output by the machine learning algorithm is a set of 2D coordinates. In a representative embodiment, the location of the structure in the volume rendering in association with the 3D ultrasound volume is stored at the storage medium by the at least one processor 132, 160 configured to access the depth map corresponding with the volume rendering and retrieving the depth value associated with the 2D coordinate identifying the location of the structure in the volume rendering. The at least one processor 132, 160 may be configured to form a set of 3D volume rendering coordinates based on the 2D coordinates identifying the location of the structure in the volume rendering and the depth value associated with the 2D coordinate. The at least one processor 132, 160 may be configured to transform the set of 3D volume rendering coordinates to a set of 3D ultrasound volume coordinates based on a difference between a reference coordinate system of the volume rendering and a reference coordinate system of the 3D ultrasound volume. The at least one processor 132, 160 may be configured to store the 3D ultrasound volume coordinates in association with the 3D ultrasound volume at the storage medium.

In an exemplary embodiment, the system 100, 200, 300 comprises a display system 134. The at least one processor 132, 170 is configured to one or both of receive a user selection or apply a setting to display the structure located in the 3D ultrasound volume. The at least one processor 132, 170 is configured to perform post-processing on the 3D ultrasound volume to generate a post-processed image. The post-processing may be based on the location of the structure and in response to one or both of the user selection or the setting to one or both of manipulate the 3D ultrasound volume into a pre-defined viewing angle and crop the 3D ultrasound volume. The at least one processor 132, 170 is configured to present, at the display system 134, the post-processed image.

In various embodiments, the system 100, 200, 300 comprises a display system 134. The at least one processor 132, 170 may be configured to one or both of receive a user selection or apply a setting to superimpose one or both of a marker or an annotation on the volume rendering in relation to the structure in the volume rendering. The at least one processor 132, 170 is configured to superimpose the one or both of the marker or the annotation on the volume rendering in relation to the structure in the volume rendering in response to the one or both of the user selection or the setting. The at least one processor 132, 170 is configured to present the volume rendering with the one or both of the marker or the annotation at the display system 134.

In a representative embodiment, the system 100, 200, 300 comprises a display system 134. The at least one processor 132, 170 is configured to receive a user selection of a measurement. The at least one processor 132, 170 is configured to re-slice the 3D ultrasound volume based on the stored location of the structure to display a 2D plane for performing the measurement. The at least one processor 132, 170 is configured to receive a placement of the measurement in the 2D plane. The at least one processor 132, 170 is configured to calculate and display a value of the measurement based on the placement.

In an exemplary embodiment, the 3D volume label may comprise a set of 3D coordinates identifying the location of the structure in one of the plurality of 3D ultrasound training volumes. The volume rendering label may comprise a set of 2D coordinates identifying the location of the structure in one of the plurality of training volume renderings.

Certain embodiments provide a non-transitory computer readable medium having stored thereon, a computer program having at least one code section. The at least one code section is executable by a machine for causing the machine to perform steps 400, 500. The steps 400, 500 may comprise receiving 404 a 3D volume label for each of a plurality of 3D ultrasound training volumes identifying a location of a structure. The steps 400, 500 may comprise rendering 406 each of the plurality of 3D ultrasound training volumes into a plurality of training volume renderings at a plurality of viewing angles. Each of the plurality of training volume renderings may be associated with a volume rendering label corresponding with the 3D volume label identifying the location of the structure. The steps 400, 500 may comprise training 408 a machine learning algorithm 160 using each of the plurality of training volume renderings and the respective associated volume rendering label. The steps 400, 500 may comprise one or both of acquiring or receiving 502 a 3D ultrasound volume. The steps 400, 500 may comprise rendering 504 the 3D ultrasound volume into a volume rendering at a viewing angle. The steps 400, 500 may comprise applying 506 the machine learning algorithm to the volume rendering to detect the location of the structure. The machine learning algorithm may output the location of the structure in the volume rendering. The steps 400, 500 may comprise storing 510 the location of the structure in the volume rendering in association with the 3D ultrasound volume at a storage medium 138.

In various embodiments, the rendering 506 the 3D ultrasound volume into the volume rendering comprises generating a depth map corresponding with the volume rendering. In certain embodiments, the depth map may associate each set of 2D coordinates of the volume rendering with a depth coordinate. In an exemplary embodiment, the location of the structure in the volume rendering output by the machine learning algorithm is a set of 2D coordinates. In various embodiments, the storing 510 the location of the structure in the volume rendering in association with the 3D ultrasound volume at a storage medium may include at least four steps. The first step may comprise accessing 508 the depth map corresponding with the volume rendering and retrieving the depth value associated with the 2D coordinate identifying the location of the structure in the volume rendering. The second step may comprise forming a set of 3D volume rendering coordinates based on the 2D coordinates identifying the location of the structure in the volume rendering and the depth value associated with the 2D coordinate. The third step may comprise transforming the set of 3D volume rendering coordinates to a set of 3D ultrasound volume coordinates based on a difference between a reference coordinate system of the volume rendering and a reference coordinate system of the 3D ultrasound volume. The fourth step may comprise storing 510 the 3D ultrasound volume coordinates in association with the 3D ultrasound volume at the storage medium 138.

In a representative embodiment, the steps 400, 500 may comprise one or both of receiving a user selection or applying a setting 512 to display the structure located in the 3D ultrasound volume. The steps 400, 500 may comprise performing 514 post-processing on the 3D ultrasound volume to generate a post-processed image. The post-processing may be based on the location of the structure and in response to one or both of the user selection or the setting to one or both of manipulate the 3D ultrasound volume into a pre-defined viewing angle and crop the 3D ultrasound volume. The steps 400, 500 may comprise presenting 516, at a display system 134, the post-processed image.

In an exemplary embodiment, the steps 400, 500 may comprise one or both of receiving a user selection or applying a setting 518 to superimpose one or both of a marker or an annotation on the volume rendering in relation to the structure in the volume rendering. The steps 400, 500 may comprise superimposing 520 the one or both of the marker or the annotation on the volume rendering in relation to the structure in the volume rendering in response to the one or both of the user selection or the setting. The steps 400, 500 may comprise presenting 520 the volume rendering with the one or both of the marker or the annotation at a display system 134.

In certain embodiments, the steps 400, 500 may comprise receiving 522 a user selection of a measurement. The steps 400, 500 may comprise re-slicing 524 the 3D ultrasound volume based on the stored location of the structure to display a 2D plane for performing the measurement. The steps 400, 500 may comprise receiving 526 a placement of the measurement in the 2D plane. The steps 400, 500 may comprise calculating and displaying 528 a value of the measurement based on the placement.

As utilized herein the term "circuitry" refers to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set $\{(x), (y), (x, y)\}$. As another example, "x, y, and/or z" means any element of the seven-element set $\{(x), (y), (z), (x, y), (x, z), (y, z), (x, y, z)\}$. As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" or "configured" to perform a function whenever the circuitry comprises the necessary hardware and code (if any is necessary) to perform the function, regardless of whether performance of the function is disabled, or not enabled, by some user-configurable setting.

Other embodiments may provide a computer readable device and/or a non-transitory computer readable medium, and/or a machine readable device and/or a non-transitory machine readable medium, having stored thereon, a machine code and/or a computer program having at least one code section executable by a machine and/or a computer, thereby causing the machine and/or computer to perform the steps as described herein for recognizing structures in three-dimensional (3D) ultrasound data based on volume renderings.

Accordingly, the present disclosure may be realized in hardware, software, or a combination of hardware and software. The present disclosure may be realized in a centralized fashion in at least one computer system, or in a distributed fashion where different elements are spread across several interconnected computer systems. Any kind of computer system or other apparatus adapted for carrying out the methods described herein is suited.

Various embodiments may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. A method comprising:
   receiving, by the at least one processor, a 3D volume label for each of a plurality of 3D ultrasound training volumes identifying a location of a structure;
   rendering, by the at least one processor, each of the plurality of 3D ultrasound training volumes into a plurality of training volume renderings at a plurality of viewing angles, wherein each of the plurality of training volume renderings is associated with a volume rendering label corresponding with the 3D volume label identifying the location of the structure;
   training a machine learning algorithm using each of the plurality of training volume renderings and the respective associated volume rendering label;
   one or both of acquiring or receiving a 3D ultrasound volume;
   rendering, by the at least one processor, the 3D ultrasound volume into a volume rendering at a viewing angle;
   applying, by the at least one processor, the machine learning algorithm to the volume rendering to detect the location of the structure, wherein the machine learning algorithm outputs the location of the structure in the volume rendering; and
   storing, by the at least one processor, the location of the structure in the volume rendering in association with the 3D ultrasound volume at a storage medium.

2. The method of claim 1, wherein the rendering the 3D ultrasound volume into the volume rendering comprises generating a depth map corresponding with the volume rendering, the depth map associating each set of 2D coordinates of the volume rendering with a depth coordinate.

3. The method of claim 2, wherein the location of the structure in the volume rendering output by the machine learning algorithm is a set of 2D coordinates.

4. The method of claim 3, wherein the storing the location of the structure in the volume rendering in association with the 3D ultrasound volume at a storage medium comprises:
   accessing the depth map corresponding with the volume rendering and retrieving the depth value associated with the set of 2D coordinates identifying the location of the structure in the volume rendering;
   forming a set of 3D volume rendering coordinates based on the set of 2D coordinates identifying the location of the structure in the volume rendering and the depth value associated with the set of 2D coordinates;
   transforming the set of 3D volume rendering coordinates to a set of 3D ultrasound volume coordinates based on a difference between a reference coordinate system of the volume rendering and a reference coordinate system of the 3D ultrasound volume; and
   storing the 3D ultrasound volume coordinates in association with the 3D ultrasound volume at the storage medium.

5. The method of claim 1, comprising:
   one or both of receiving a user selection or applying a setting to display the structure located in the 3D ultrasound volume;
   performing, by the at least one processor, post-processing on the 3D ultrasound volume to generate a post-processed image, the post-processing based on the location of the structure and in response to one or both of the user selection or the setting to one or both of manipulate the 3D ultrasound volume into a pre-defined viewing angle and crop the 3D ultrasound volume; and
   presenting, at a display system, the post-processed image.

6. The method of claim 1, comprising:
   one or both of receiving a user selection or applying a setting to superimpose one or both of a marker or an annotation on the volume rendering in relation to the structure in the volume rendering;
   superimposing, by the at least one processor, the one or both of the marker or the annotation on the volume rendering in relation to the structure in the volume rendering in response to the one or both of the user selection or the setting; and
   presenting the volume rendering with the one or both of the marker or the annotation at a display system.

7. The method of claim 1, comprising:
   receiving a user selection of a measurement;
   re-slicing, by the at least one processor, the 3D ultrasound volume based on the stored location of the structure to display a 2D plane for performing the measurement;
   receiving a placement of the measurement in the 2D plane; and
   calculating by the at least one processor and displaying at a display system a value of the measurement based on the placement.

8. The method of claim 1, wherein the 3D volume label comprises a set of 3D coordinates identifying the location of the structure in one of the plurality of 3D ultrasound training volumes, and wherein the volume rendering label comprises a set of 2D coordinates identifying the location of the structure in one of the plurality of training volume renderings.

9. A system comprising:
   at least one processor configured to:
      receive a 3D volume label for each of a plurality of 3D ultrasound training volumes identifying a location of a structure;
      render each of the plurality of 3D ultrasound training volumes into a plurality of training volume renderings at a plurality of viewing angles, wherein each of the plurality of training volume renderings is associated with a volume rendering label corresponding with the 3D volume label identifying the location of the structure;
      train a machine learning algorithm using each of the plurality of training volume renderings and the respective associated volume rendering label;
      receive a 3D ultrasound volume;

render the 3D ultrasound volume into a volume rendering at a viewing angle; and
apply the machine learning algorithm to the volume rendering to detect the location of the structure, wherein the machine learning algorithm outputs the location of the structure in the volume rendering; and
a storage medium configured to store the location of the structure in the volume rendering in association with the 3D ultrasound volume.

10. The system of claim 9, wherein:
the at least one processor is configured to generate a depth map corresponding with the volume rendering, the depth map associating each set of 2D coordinates of the volume rendering with a depth coordinate; and
the location of the structure in the volume rendering output by the machine learning algorithm is a set of 2D coordinates.

11. The system of claim 10, wherein the location of the structure in the volume rendering in association with the 3D ultrasound volume is stored at the storage medium by the at least one processor configured to:
access the depth map corresponding with the volume rendering and retrieving the depth value associated with the set of 2D coordinate identifying the location of the structure in the volume rendering;
form a set of 3D volume rendering coordinates based on the set of 2D coordinates identifying the location of the structure in the volume rendering and the depth value associated with the set of 2D coordinates;
transform the set of 3D volume rendering coordinates to a set of 3D ultrasound volume coordinates based on a difference between a reference coordinate system of the volume rendering and a reference coordinate system of the 3D ultrasound volume; and
store the 3D ultrasound volume coordinates in association with the 3D ultrasound volume at the storage medium.

12. The system of claim 9, comprising a display system, wherein the at least one processor is configured to:
one or both of receive a user selection or apply a setting to display the structure located in the 3D ultrasound volume;
perform post-processing on the 3D ultrasound volume to generate a post-processed image, the post-processing based on the location of the structure and in response to one or both of the user selection or the setting to one or both of manipulate the 3D ultrasound volume into a pre-defined viewing angle and crop the 3D ultrasound volume; and
present, at the display system, the post-processed image.

13. The system of claim 9, comprising a display system, wherein the at least one processor is configured to:
one or both of receive a user selection or apply a setting to superimpose one or both of a marker or an annotation on the volume rendering in relation to the structure in the volume rendering;
superimpose the one or both of the marker or the annotation on the volume rendering in relation to the structure in the volume rendering in response to the one or both of the user selection or the setting; and
present the volume rendering with the one or both of the marker or the annotation at the display system.

14. The system of claim 9, comprising a display system, wherein the at least one processor is configured to:
receive a user selection of a measurement;
re-slice the 3D ultrasound volume based on the stored location of the structure to display a 2D plane for performing the measurement;
receive a placement of the measurement in the 2D plane; and
calculate and display a value of the measurement based on the placement.

15. The system of claim 9, wherein the 3D volume label comprises a set of 3D coordinates identifying the location of the structure in one of the plurality of 3D ultrasound training volumes, and wherein the volume rendering label comprises a set of 2D coordinates identifying the location of the structure in one of the plurality of training volume renderings.

16. A non-transitory computer readable medium having stored thereon, a computer program having at least one code section, the at least one code section being executable by a machine for causing the machine to perform steps comprising:
receiving a 3D volume label for each of a plurality of 3D ultrasound training volumes identifying a location of a structure;
rendering each of the plurality of 3D ultrasound training volumes into a plurality of training volume renderings at a plurality of viewing angles, wherein each of the plurality of training volume renderings is associated with a volume rendering label corresponding with the 3D volume label identifying the location of the structure;
training a machine learning algorithm using each of the plurality of training volume renderings and the respective associated volume rendering label;
one or both of acquiring or receiving a 3D ultrasound volume;
rendering the 3D ultrasound volume into a volume rendering at a viewing angle;
applying the machine learning algorithm to the volume rendering to detect the location of the structure, wherein the machine learning algorithm outputs the location of the structure in the volume rendering; and
storing the location of the structure in the volume rendering in association with the 3D ultrasound volume at a storage medium.

17. The non-transitory computer readable medium of claim 16, wherein:
the rendering the 3D ultrasound volume into the volume rendering comprises generating a depth map corresponding with the volume rendering, the depth map associating each set of 2D coordinates of the volume rendering with a depth coordinate;
the location of the structure in the volume rendering output by the machine learning algorithm is a set of 2D coordinates; and
the storing the location of the structure in the volume rendering in association with the 3D ultrasound volume at a storage medium comprises:
accessing the depth map corresponding with the volume rendering and retrieving the depth value associated with the set of 2D coordinates identifying the location of the structure in the volume rendering;
forming a set of 3D volume rendering coordinates based on the set of 2D coordinates identifying the location of the structure in the volume rendering and the depth value associated with the set of 2D coordinates;
transforming the set of 3D volume rendering coordinates to a set of 3D ultrasound volume coordinates based on a difference between a reference coordinate system of the volume rendering and a reference coordinate system of the 3D ultrasound volume; and storing the 3D ultrasound volume coordinates in association with the 3D ultrasound volume at the storage medium.

18. The non-transitory computer readable medium of claim 16, comprising:
   one or both of receiving a user selection or applying a setting to display the structure located in the 3D ultrasound volume;
   performing post-processing on the 3D ultrasound volume to generate a post-processed image, the post-processing based on the location of the structure and in response to one or both of the user selection or the setting to one or both of manipulate the 3D ultrasound volume into a pre-defined viewing angle and crop the 3D ultrasound volume; and
   presenting, at a display system, the post-processed image.

19. The non-transitory computer readable medium of claim 16, comprising:
   one or both of receiving a user selection or applying a setting to superimpose one or both of a marker or an annotation on the volume rendering in relation to the structure in the volume rendering;
   superimposing the one or both of the marker or the annotation on the volume rendering in relation to the structure in the volume rendering in response to the one or both of the user selection or the setting; and
   presenting the volume rendering with the one or both of the marker or the annotation at a display system.

20. The non-transitory computer readable medium of claim 16, comprising:
   receiving a user selection of a measurement;
   re-slicing the 3D ultrasound volume based on the stored location of the structure to display a 2D plane for performing the measurement;
   receiving a placement of the measurement in the 2D plane; and
   calculating and displaying a value of the measurement based on the placement.

* * * * *